April 11, 1967 F. P. MERRELS 3,312,997
PATTY MAKING MACHINE

Filed Feb. 3, 1965 3 Sheets-Sheet 1

INVENTOR
FREDERIC P. MERRELS

BY Fisher, Christey, Sobol & Caldwell
ATTORNEYS

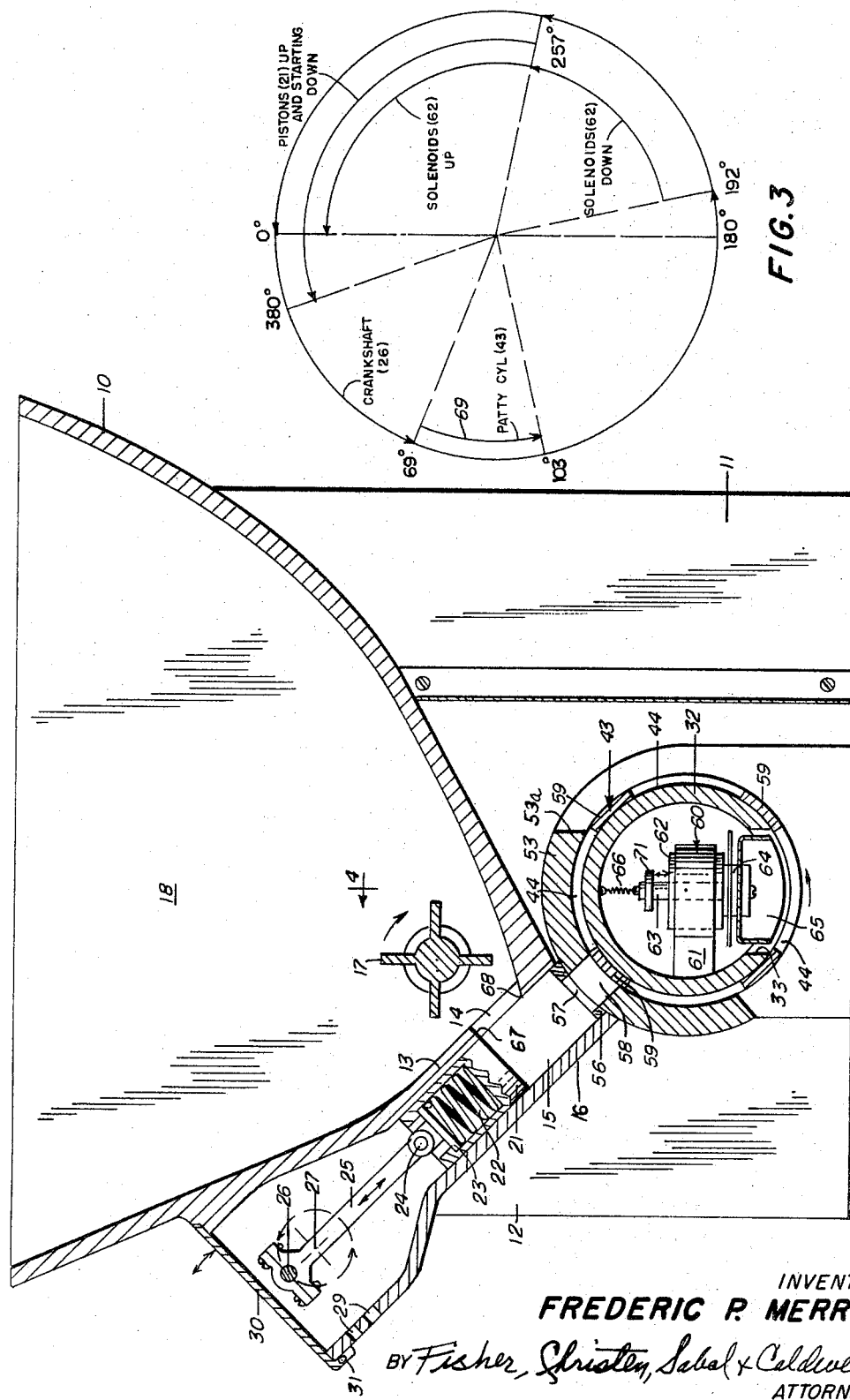

April 11, 1967 F. P. MERRELS 3,312,997
PATTY MAKING MACHINE
Filed Feb. 3, 1965 3 Sheets-Sheet 3
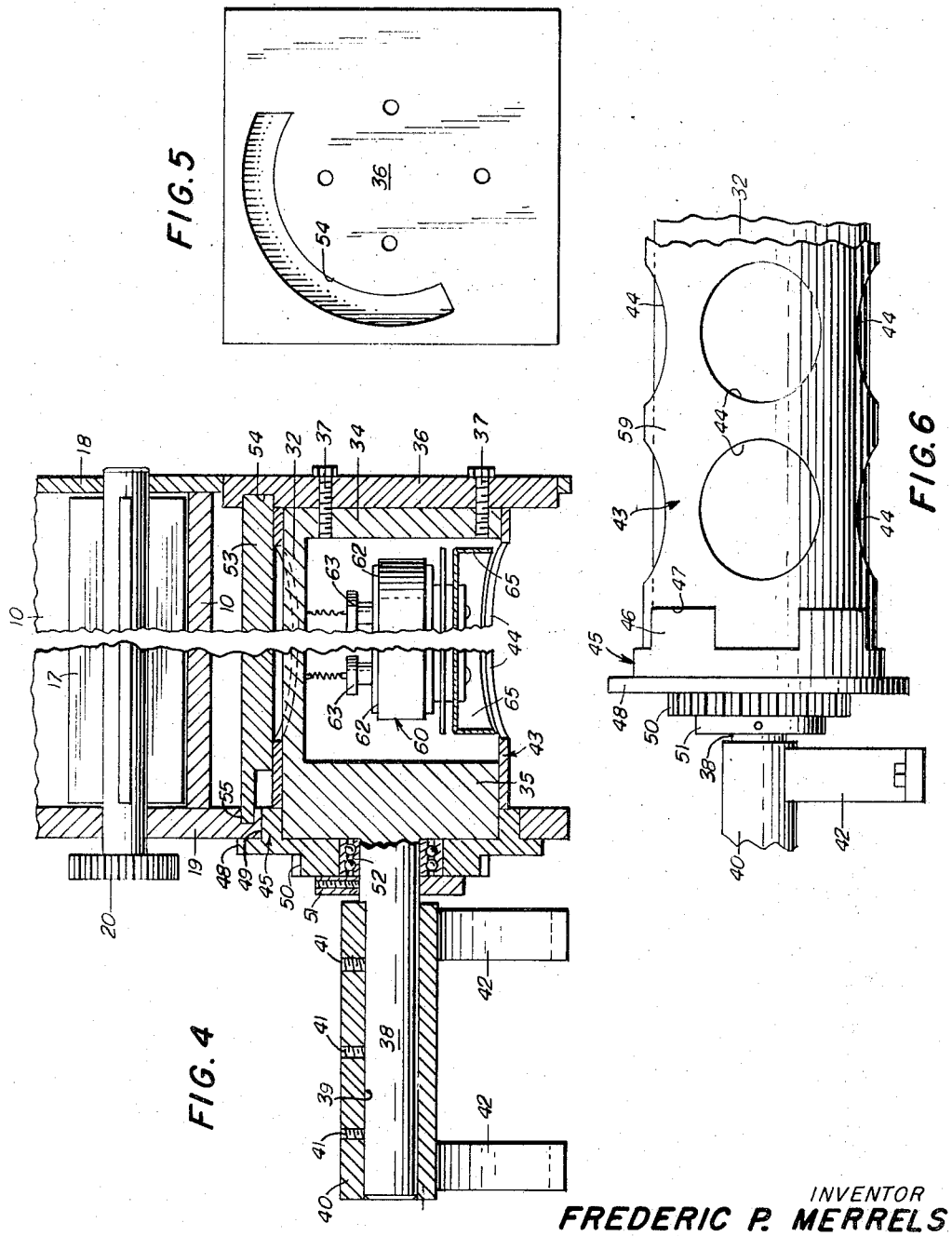
INVENTOR
FREDERIC P. MERRELS
BY Fisher, Christen, Sabol & Caldwell
ATTORNEYS United States Patent Office 3,312,997
Patented Apr. 11, 1967

3,312,997
PATTY MAKING MACHINE
Frederic P. Merrels, 5609 Wilson Lane,
Bethesda, Md. 20014
Filed Feb. 3, 1965, Ser. No. 430,117
9 Claims. (Cl. 17—32)

This invention relates to a machine for producing ground meat patties.

A primary object of the invention is to provide a machine of the mentioned class which is compact and simplified in construction and which has a very high production capacity compared to prior art machines for the same general purpose.

Another object is to provide a meat pattying machine which is rapid and efficient in operation and which is easy to assemble, disassemble and clean.

Another object of the invention is to provide a meat patty producing machine whose basic construction lends itself to the incorporation of multiple patty-forming units or machine sections with the fewest possible parts in the overall structure.

Another important object is to provide a machine which will not be adversely effected by temperature or atmospheric conditions prevailing in meat packing plants.

Still another object of the invention is to provide a machine of the mentioned class which is adjustable from the standpoint of producing meat patties of various diameters and thicknesses, as well as density.

Other objects and advantages of the invention will become apparent during the course of the following detailed description.

In the accompanying drawings forming a part of this application and in which like numerals are employed to designate like parts throughout the same, FIGURE 1 is a perspective view of a machine for producing ground meat patties in accordance with the invention, parts broken away and parts omitted for simplicity of illustration;

FIGURE 2 is an enlarged transverse vertical section taken through one of the meat compression chambers of the machine illustrated in FIGURE 1;

FIGURE 3 is a diagram indicating the relative rotational movements and other related actions in the machine during a complete cycle of operation thereof;

FIGURE 4 is a fragmentary longitudinal vertical section taken on line 4—4 of FIGURE 2;

FIGURE 5 is an interior side elevation of an end plate employed in the machine; and FIGURE 6 is a fragmentary side elevational view of a rotary sleeve assembly and associated elements.

Figure 1:
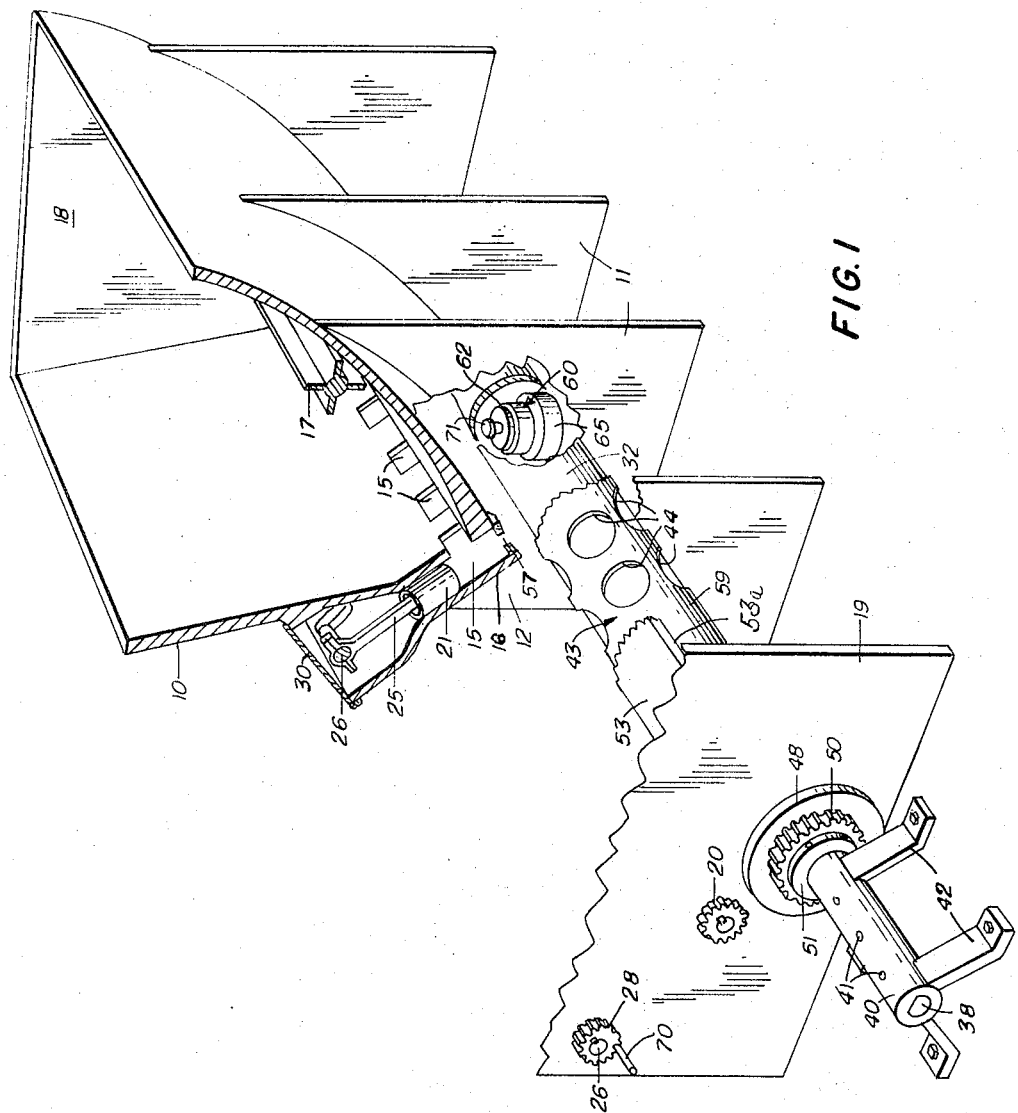

In the drawings, wherein for the purpose of illustration is shown a preferred embodiment of the invention, the numeral 10 designates an elongated hopper adapted to receive a quantity of ground meat, and being supported on opposite sides by suitable leg structures 11 and 12, rigid therewith. As shown in the drawings, the hopper 10 tapers downwardly and has an inclined lower wall portion 13 provided with outlet ports 14 leading into meat compression cylindrical chambers 15 formed in a housing extension 16 on one side wall of the hopper 10. There are preferably about twelve of the chambers 15 spaced apart uniformly along the length of the hopper, although the number of chambers may be varied in order to build machines of different capacities.

Arranged within the bottom portion of the hopper 10 near and above the outlet ports 14 is a bladed rotary feeder paddle 17 having its ends journaled for rotation upon vertical end plates 18 and 19 of the machine. As best shown in FIGURE 4, the feeder paddle 17 carries a drive gear 20 outwardly of the end plate 19 adapted to engage suitable gearing, not shown.

Mounted within each compression chamber 15 for reciprocation therein is a compression piston 21, having a compression spring 22 mounted therein so that the piston may yield under certain load conditions. The piston also contains a disc element 23 bearing upon the spring 22 and being pivotally secured at 24 to a connecting rod 25 which is in turn connected to one of the crank pins 26 of a rotary crank shaft in the housing extension 16. The rotational axis of the crank shaft is indicated at 27 in FIGURE 2, and the crank shaft is driven from one end of the machine by a gear 28, FIGURE 1, exteriorly of the end plate 19. It should be clearly understood that there is one piston 21 and connecting rod for each of the compression chambers 15 and these elements are driven by a single crank shaft which extends longitudinally of the machine. The construction lends itself exceedingly well to building a machine with multiple working units in a very compact manner and with the minimum number of working parts.

The housing extension 16 may be provided with air vent openings 29 as required and a servicing cover or lid 30 is preferably provided on the housing extension, hinged thereto at 31.

Beneath the hopper 10 and close to the bottom thereof and extending lengthwise and parallel with relation to the hopper is a stationary cylindrical mounting or base sleeve 32 having a longitudinal slot 33 opening through its bottom, the sleeve including integral end walls 34 and 35, as shown in FIGURE 4. One end of this elongated sleeve 32 is supported upon a vertical end plate 36 and is rigidly secured thereto by screws 37. The end plate 36 is recessed into the leg structure of the machine at one end thereof. The other end of the stationary sleeve 32 carries an integral longitudinal shaft extension 38 having a preferably flattened face 39. This shaft extension engages through a tubular support bearing 40 and is held rigidly therein by set screws 41. The bearing 40 has legs 42 which may be bolted to a floor.

Surrounding the stationary sleeve 32 closely and rotatably is a cylindrical pattying sleeve 43 which extends for substantially the entire length of the sleeve 32 and machine. The pattying sleeve 43 has preferably four longitudinal rows of patty-forming circular openings 44 formed radially therethrough, with the openings of each row equidistantly spaced longitudinally and the rows equidistantly spaced apart circumferentially. The number of openings 44 in each row and therefore each circumferential group of openings in the pattying sleeve corresponds to the number of compression chambers 15 and associated elements in a particular machine.

A drive plate 45 for pattying sleeve 43 is keyed thereto by means of teeth 46 which interfit with slots 47 in one end of the pattying sleeve detachably. The drive plate 45 has an exterior flange 48 which abuts the outer face of end plate 19, and the drive plate is received within an opening 49 of end plate 19, concentric with the pattying sleeve 43 and larger in diameter than the pattying sleeve, as shown in FIGURE 4. The drive plate 45 has an integral gear 50 formed thereon adapted to mesh with a gear, not shown, forming a part of the main power train of the machine. The main motor and part of the conventional gearing has been omitted from the drawings for simplicity of illustration, and is thought to be unnecessary to a proper understanding of the invention. The drive plate 45 is held in place against the end plate 19 by a positioning collar 51 on shaft extension 38. The drive plate 45 is also preferably mounted upon a ball bearing 52 which surrounds the shaft extension 38 to assure free rotation of the drive plate and pattying sleeve 43.

Exteriorly of the pattying sleeve 43 and partially surrounding the same and slidably contacting the exterior face of the pattying sleeve is a stationary arcuate shear plate 53 whose opposite ends are fixedly supported within arcuate slots formed in the interior faces of plates 36 and 19. One such supporting slot 54 in the end plate 36 is shown clearly in FIGURE 5. The end plate 19 has a similar supporting slot at 55, FIGURE 4. In effect, the shear plate 53 is clamped rigidly between the plates 19 and 36 in assembly and the shear plate is interposed between the bottoms of the chambers 15 and the pattying sleeve 43 as depicted in FIGURE 2. The shear plate 53 extends for less than one-half of the diameter of the pattying sleeve 43 as shown in FIGURE 2.

The bottoms of the compression chambers or cylinders 15 have fixed therein disc or plate elements 56 containing slots 57 through which the meat is forced by compression when the pistons 21 descend. The shear plate 53 is provided adjacent the bottom of each chamber 15 with a coacting slot or passage 58 through which the meat is also forced in a manner to be described for entering the patty-forming openings 44. The slots 58 are of such a size that they may be entirely covered at intervals during the operation of the machine by the solid webs 59 between adjacent openings 44 of each circumferential group of openings in the pattying sleeve 43, see FIGURE 2. In order to allow air to escape as the meat is initially forced into the openings 44, the leading edge 53a of the shear plate should be positioned at a point such that the opening 44 will not be completely covered by the upper portion of the shear plate until the leading edge of opening 44 has moved under the passage 58 for a short distance.

For ejecting each meat patty from its opening 44 in the pattying sleeve, there is provided within the interior stationary sleeve 32 adjacent each chamber 15 a preferably electrical ejection device shown generally at 60. Each such device comprises a support arm 61 rigid with the sleeve 32 and carrying an electrical solenoid 62 having an armature 63 which is thrust downward when the solenoid is energized. Beneath the arm 61, the solenoid armature has a head 64 carrying a patty ejecting plate or cup 65, as shown in the drawings. The armature 63 is provided with a return spring 66 which raises the ejection cup 65 to the retracted position shown in FIGURE 2 whenever the solenoid is de-energized. The cup 65 is of a proper diameter to enter the opening 44 aligned therewith and to eject the meat patty cleanly from the aligned opening. In the retracted position, the ejection cup 65 lies completely inside of the rotary pattying sleeve 43 so that the same can revolve without interference with the cup.

The necessary wiring for the several solenoids 62 may be brought in through a small passage, not shown, in the shaft extension 38 and stationary end wall 35 and also through similar passages in the wall 34 and plate 36, if required.

The operation of the meat pattying machine is as follows:

The diagram in FIGURE 3 represents the essential actions which take place in the machine during one complete revolution counter-clockwise of the crank shaft having crank pins 26. As each crank pin 26 revolves in the counter-clockwise direction, the associated piston 21 descends in the compression chamber 15. All of the chambers 15 have been previously filled with ground meat from the hopper 10 by rotation of the feeder paddle 17. When the crank shaft has rotated approximately sixty-nine degrees counter-clockwise, FIGURE 3, each piston 21 will have reached a point in the cylinder 15 where its lower end is approximately halfway between the edges 67 and 68 of port 14, whereby such port is now approximately one-half closed by the piston 21. At this time, the gear 50 begins to be driven by the power train, not shown, and the pattying sleeve 43 begins to turn counter-clockwise beneath the slot 58 of shear plate 53. Such initial movement is indicated in FIGURE 3 of the drawings by the arrow 69. It will be noted at this point in the operation that the pistons 21 are descending at a rate approaching their highest velocities. At this same time, however, the patty-forming openings 44 shown at the top of FIGURE 2 are presenting their minimum volume portions to the slots 58. Therefore, initially, a sizable portion of excess meat in chambers 15 will be forced back into the trough 10 and around the feeder paddle 17. At this time, preferably, the paddle 17 has its gear 20 released from the drive train, not shown, so that the paddle is free to turn in any direction under the back pressure of the returning meat. The meat which is now entering the openings 44 in one longitudinal row of openings is held within the confines of these openings by the stationary sleeve 32 and by the outer shear plate 53, which elements are on opposite sides of the rotary pattying sleeve 44, as shown and described.

As downward travel of the pistons 21 continues, an ever-increasing volume section of patty-forming openings 44 is presented to the slots 58, and less and less meat is forced back through the ports 14 into the hopper 10. The power gearing is so designed that when the pistons 21 have reached the points 68 and the ports 14 are completely covered by the pistons, the maximum volume sections of the openings 44 are presented to the slots 58. There is then a maximum flow of meat from the chambers 15 directly into the openings 44 and no back-flow of meat to the hopper 10.

As the pistons 21 continue to move downwardly, the smaller volume sections of the openings 44 toward their trailing sides begin to come under the slots 57 and 58 as the pattying sleeve 43 continues to rotate counter-clockwise. This causes greater pressure on the meat passing through the slots 57 and 58 and tends to completely fill the remaining empty areas of the openings 44 which are in communication with the slots. When the openings 44 of the particular row are completely filled, the pistons 21 are still descending near the end of their downward strokes. The springs 22 begin to yield at this point, cushioning the balance of the downward stroke so that any excess or unused meat in the chambers 15 can be tolerated without damaging the machine. It might be mentioned here that by changing the strength of springs 22, the density of the meat patties can be regulated.

When the pistons 21 are at their lowermost positions in the chambers 15, after 180 degrees of crank shaft rotation, FIGURE 3, the uppermost row of pattying openings 44, FIGURE 2, will have completely passed under and beyond the slots 58 and these slots are now completely covered by the adjacent solid web portions 59 of the pattying sleeve 43, so that no further flow of meat through the slots 57 and 58 can take place prior to the next cycle of operation. Pattying sleeve 43 driven by integral gear 50 now stops at this point and the power train, not shown, is constructed to cause this operation.

While the first set or row of openings 44 are passing under the slots 58, the next following or trailing row of openings have now moved to a point adjacent the top of sleeve 32 where they are ready to present themselves to the slot 58 for filling with meat during the next cycle of operation of the machine. Likewise, the next leading row of openings 44 have now progressed to the bottom of the stationary sleeve 32, adjacent the opening 33 thereof. This row of openings 44 now at the bottom of the sleeve 32 was filled with meat on the previous revolution of the crank shaft 27 or prior to the cycle of operation described in detail above.

The openings 44 adjacent the slots 33 are now aligned with the ejecting cups or plates 65. At approximately 192 degrees of rotation of the crank shaft, FIGURE 3, or shortly after the pistons 21 start their upward strokes, a normally open switch, not shown, is closed by a pin element attached to the crank shaft drive gear 28, such pin element being indicated by the numeral 70, FIGURE 1. Any other type of moving projection on the rotating crank shaft could be utilized to close this switch. The closing of the switch instantly energizes the several solenoids 62 causing their armatures 63 to move downwardly, FIGURE 2, and the plural ejecting cups 65 will simultaneously eject the meat patties from the bottom row of openings 44, allowing the patties to drop onto a suitable support where they will assume a flat circular shape. The downward movement of the solenoid armatures 63 is arrested by enlarged heads 71 on the upper ends thereof which engage the stationary coils of the solenoids.

Shortly thereafter, the pin 70 disengages the switch, not shown, allowing the same to re-open, thus de-energizing the solenoids 62. The springs 66 then immediately retract the armatures 63 and the ejecting cups 65 to their positions shown in FIGURE 2 and this action will be completed by the time that the crank shaft has completed its revolution and is back to the zero degree point in FIGURE 3.

As the pistons 21 continue their upward movement, they pass the point 68 and this is approximately 257 degrees in the crank shaft cycle, FIGURE 3. At this point, the feeder paddle gear 20 begins to mesh with a partial gear, not shown, in the main gear train and starts rotating the feeder paddle 17 in the clockwise direction, FIGURE 2. This forces a new charge of meat through the ports 14 and as the pistons continue to rise, the meat again fills the chambers 15. When the pistons 21 have risen to their uppermost positions and have just begun to descend again, 380 degrees of rotation in FIGURE 3, the feeder paddle 17 stops its rotation because its gear 20 has again become unmeshed from the partial gear above-mentioned.

In an actual machine embodying the invention, the pattying sleeve 43 turns 90 degrees per second and twelve complete patties are formed each second and are discharged from one row of openings 44. Since there are 3600 seconds in an hour, the capacity of a twelve piston machine is 43,200 patties per hour.

By removal of the right-hand end plate 36, FIGURE 4, the curved shear plate 53 and the pattying sleeve 43 are easily removable endwise for servicing and cleaning. The stationary sleeve 32 remains fully supported at this time by the support bearing 40.

The application drawings illustrate the pattying sleeve 43 as being of a certain radial thickness relative to the surrounding shear plate 53. In practice, the thickness of the sleeve 43 and consequently the thickness of the meat patties may vary from less than ⅛ of an inch up to over one inch. The annular drive plate, FIGURE 4, is purposely made thick enough to drive a pattying sleeve 43 of about one inch thickness, not shown in the drawings. When such a relatively thick sleeve 43 is employed, the exterior shear plate 53 will be correspondingly thinner. Additionally, the size or diameter of the openings 44 may be varied under the invention from sleeve-to-sleeve or even in one sleeve 43. Furthermore, while the machine shown in the drawings comprises a number of patty forming stations integrally combined in a single unit, it will be understood that they could be fabricated as a series of identical separable units, whereby variations in the capacity of the machine could be accomplished by the addition, or removal, of patty forming stations.

When openings 44 of different sizes are provided in the sleeve 43, individual openings or a circumferential row of openings may be closed by disconnecting the associated pistons 21 and allowing them to rest freely in the bottoms of chambers 15.

Another feature of the invention resides in the fact that it is easy to assembly and disassemble and may be readily cleaned by flushing out with hot water after preliminary disassembling procedures. In this connection, the end plate 36, FIGURE 4, may be removed, allowing the pattying sleeve 43 and the shear plate 53 to be slipped off of the base sleeve 32 which remains supported at one end by the bearing structure 40, as previously described.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A machine for producing meat patties comprising an elongated hopper adapted to contain ground meat, a plurality of meat compression chambers near the bottom of the hopper to receive meat from the hopper, said hopper having opening means communicating with said chambers, movable means in the hopper to propel meat through the opening means into the chambers, pistons associated with said compression chambers to compress the ground meat therein, said chambers having outlets for compressed ground meat at corresponding ends thereof, a stationary supporting sleeve arranged beneath the hopper and extending lengthwise thereof and spaced from said outlets, a pattying sleeve surrounding said stationary supporting sleeve and rotatably mounted thereon and having circumferentially spaced groups of patty-forming openings therein adapted to pass adjacent to the outlets of said chambers, compressed meat in said chambers then adapted to enter the patty-forming openings through said outlets, and movable means on said stationary supporting sleeve to eject meat patties from the openings of the pattying sleeve at a point during the rotational cycle of the latter.

2. A machine for producing meat patties comprising a hopper for ground meat, said hopper having an outlet near its lower end, a rotary paddle device in said hopper near said outlet to feet ground meat through the outlet, a meat compression chamber beneath the outlet of the hopper to receive ground meat, said chamber having a discharge opening, piston means in said chamber to compress the ground meat and force it through the discharge opening, a rotary pocketed patty-forming sleeve beneath said hopper and spaced from the discharge opening, said sleeve having circumferentially spaced pockets adapted to travel adjacent said discharge opening and intervening solid web portions adapted to intermittently cover the discharge opening, a stationary supporting sleeve within the pattying sleeve and constituting one wall of a mold chamber, an arcuate shear plate arranged exteriorly of the patty-forming sleeve and spaced radially from said supporting sleeve and forming the opposite wall of said mold chamber, and power-operated means on the stationary supporting sleeve to eject molded meat patties from the pockets of the patty-forming sleeve at one point on the rotational cycle thereof.

3. The invention as defined by claim 2, and wherein said patty-forming sleeve contains plural groups of said circumferentially spaced pockets and said piston means comprises multiple pistons corresponding in number to said groups, and crank shaft means common to said pistons to reciprocate the same in unison.

4. The invention as defined by claim 2, and wherein said power-operated means on the stationary supporting sleeve comprises a solenoid having a reciprocating armature and an ejector member carried by said armature and adapted to register with said pockets of the patty-forming sleeve, said supporting sleeve having an opening to receive the ejector member.

5. A machine for mass producing ground meat patties comprising a trough to receive a mass of ground meat and having an outlet near its bottom, means to assist in discharging ground meat through said outlet, a receiver and compression chamber immediately below said trough to receive ground meat from said outlet, said chamber having a discharge opening, piston means in said chamber to compress the ground meat therein and to force the same through said discharge opening, said piston means also adapted to cover said outlet while compressing said meat in said chamber, a pair of spaced concentrically arranged stationary mold members beneath said trough and near said discharge opening, the outer mold member having an opening in registration with the discharge opening, a rotary patty-forming sleeve between said concentric stationary mold members and substantially slidably contacting the same and having an annular group of patty-forming mold pockets and intervening solid web portions adapted to intermittently cover said opening of the outer mold member, and means on the inner mold member of said pair to eject molded patties from the mold pockets of said group in succession at a point spaced circumferentially from said receiver and compression chamber.

6. The invention as defined by claim 5, and wherein said piston means comprises a piston body, a crank shaft and connecting rod to operate the piston body, and a yielding connection between the piston body and connecting rod, whereby excessive pressure on the end of said piston may be relieved.

7. The invention as defined by claim 5, and wherein said means to eject mold patties comprises a solenoid within the confines of the inner mold member, and an ejection cup on the armature of the solenoid adapted to register substantially with said mold pockets of the patty-forming sleeve, said inner mold member having a clearance opening for said ejection cup.

8. A meat patty producing machine comprising a hopper for ground meat, said hopper having a ground meat outlet near its lower end and means to assist ground meat through said outlet, a compression chamber adjacent said outlet and exteriorly of the hopper and receiving ground meat from the outlet and having a discharge opening, means to compress the ground meat within the compression chamber and to force the compressed meat through the discharge opening and to substantially simultaneously cover said outlet, a rotary sleeve having circumferential patty-molding means to be positioned adjacent to the discharge opening to receive the compressed meat therefrom and to mold the same into meat patties of uniform nature in a rapid and continuous manner, and means separate from the patty-molding means and movable relative thereto for ejecting patties radially from said molding openings.

9. In a meat pattying machine, an elongated substantially horizontal relatively stationary base sleeve having lower side opening means and including a supporting shaft extension on one end thereof, a fixed bearing structure receiving and supporting said shaft extension, whereby said base sleeve is bodily supported fixedly on the bearing structure, an aperture pattying sleeve rotatably surrounding said base sleeve and being substantially coextensive therewith and supported thereby, a drive plate rotatably mounted upon the base sleeve near one end thereof and including a gear part and having detachable interlocking engagement with the pattying sleeve enabling the latter to be revolved upon the base sleeve and to be removed endwise therefrom, a machine end plate connected with the end of the base sleeve remote from said shaft extension, an opposing machine end plate near the other end of the base sleeve having abutting relation with the drive plate, an arcuate shear plate partly surrounding the pattying sleeve in concentric substantially sliding relation therewith, said machine end plates having opposed recesses receiving the ends of the shear plate in interlocking clamped relation, hopper means carried by the machine end plates above said shear plate and said sleeves, and meat patty ejecting means within the interior of the base sleeve adjacent the lower side opening means.

References Cited by the Examiner
UNITED STATES PATENTS

| | | | |
|---|---|---|---|
| 994,714 | 6/1911 | Boyle | 17—32 |
| 2,338,939 | 1/1944 | Holly | 17—32 |
| 2,708,287 | 5/1955 | Long et al. | 17—32 |
| 3,096,540 | 7/1963 | Miller et al. | 17—32 |

FOREIGN PATENTS

| | | |
|---|---|---|
| 48,163 | 12/1933 | Denmark. |
| 1,299,086 | 6/1962 | France. |
| 631,421 | 6/1936 | Germany. |

LUCIE H. LAUDENSLAGER, *Primary Examiner.*